Patented June 10, 1947

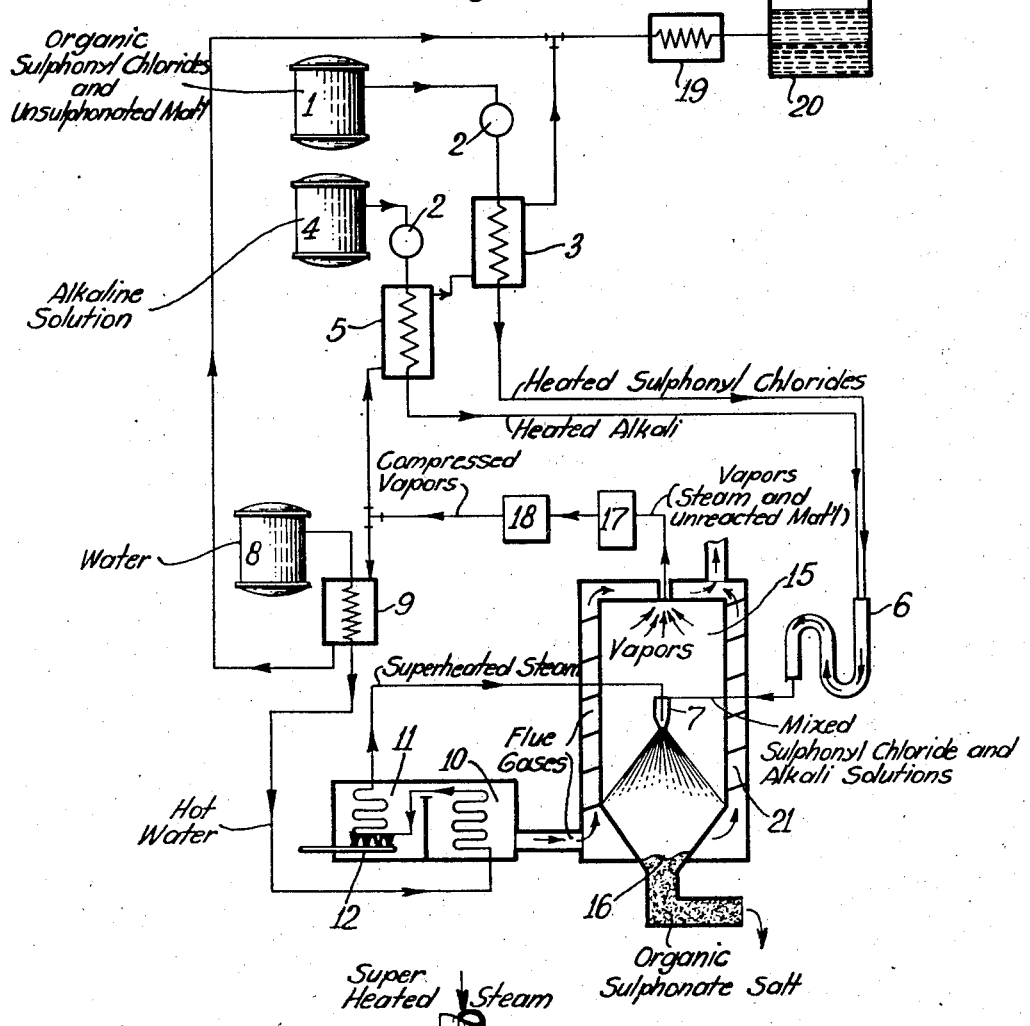
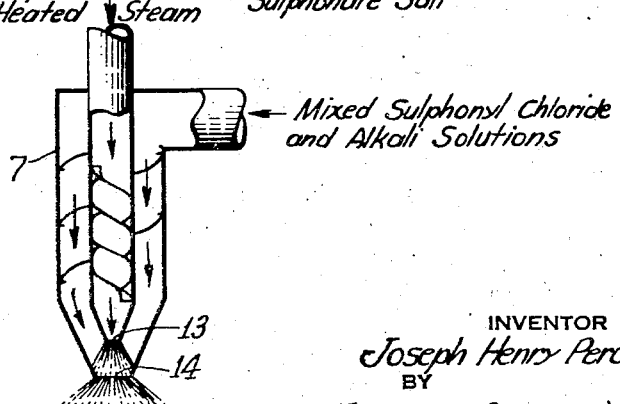

2,422,128

UNITED STATES PATENT OFFICE 2,422,128

PROCESS OF PREPARING PURIFIED ORGANIC SULPHONATES

Joseph Henry Percy, New York, N. Y., assignor to Colgate-Palmolive-Peet Company, Jersey City, N. J., a corporation of Delaware Application August 9, 1941, Serial No. 406,223

18 Claims. (Cl. 260—504)

The present invention relates to a process of refining sulphonated organic compounds, and more particularly, to a process for simultaneously hydrolyzing, neutralizing and purifying organic sulphonyl halides.

Over a period of many years, numerous processes for continuously preparing and drying soaps have been employed. These methods have been applied, so far as practicable, to the synthetic non-soap detergents which have partly replaced soaps for many uses. Of these synthetic materials, the sulphonate detergents have found considerable favor as being inexpensive to prepare and as possessing, when purified, excellent deterging, emulsifying and foaming properties.

A process of forming such sulphonate materials by reacting organic compounds, and especially petroleum hydrocarbons, with sulphur dioxide and chlorine in the presence of light has been described and patented. However, a real difficulty encountered in the commercial manufacture of the products of this reaction is their production free from unreacted raw materials, such as unreacted oil. The unreacted raw material greatly impairs the detergent efficiency of the sulphonated product and, in the case of certain raw materials, e. g., mineral oil, frequently causes stickiness and staining of the object or fabric being washed. While the presence of such unreacted raw material would be undesirable in the case of any sulphonate product, it is even more highly objectionable than usual where the product is the result of sulphonation with sulphur dioxide and chlorine. It has been found that the best products of this reaction are produced when the reaction is carried only part way toward completion, say about 50%; there is therefore considerably more unreacted material in the reaction product than with other sulphonation methods and hence considerably greater necessity for its efficient removal.

Various solvent purification methods have been suggested by the prior art, but these methods have distinct disadvantages for several reasons. They normally involve the use of large and very costly equipment, which takes up a great deal of space and increases fixed costs. Moreover, the solvent purification methods introduce technical difficulties caused by corrosion, formation of emulsions, etc. Aqueous solutions of sulphonate salts produced by sulphonating with sulphur dioxide and chlorine give emulsions very readily, and, if alcohols are used as emulsion breakers, large amounts of the extracting solvents are dissolved. The solvents also cause explosion hazards, and there is the possibility of toxicity in the case of workmen using them. Another difficulty is encountered in drying, because concentration of the solution often results in foaming to an uncontrollable degree as well as in decomposition of the dried non-fusible salt products.

According to the present invention, unsaponifiable and unsulphonated material can be economically removed from sulphonated organic compounds with a minimum of handling and without decomposition of the sulphonated product.

It is an object of the invention to provide a process of concentrating and refining sulphonated organic materials free from unsaponified and unsulphonated material.

It is another object of this invention to provide a process for preparing detergent sulphonate salts, either dry or of a definite water content, in a continuous manner in simple and inexpensive equipment.

It is also an object of the present invention to provide a process for hydrolyzing and neutralizing sulphonyl halides and simultaneously removing unreacted materials therefrom.

Other objects and advantages of the invention will be apparent to those skilled in the art from the following description, taken in conjunction with the accompanying drawing in which:

Fig. 1 is a diagrammatic flow sheet, illustrating a sequence of operations and equipment in a modification of the present invention; and Fig. 2 depicts an elevational view of a spray nozzle suitable for use in the process of the present invention, partly broken away for greater clarity and with directional arrows to indicate fluid flow therethrough.

Broadly stated, this invention relates to a process of preparing a hot mixture of a solution of a sulphonated organic compound with a solution of a hydrolyzing agent, preferably in momentary contact with a gas such as steam, and reducing the pressure on the mixed solutions (flashing) while maintaining a temperature above the boiling point of the solvent at such reduced pressure, thereby hydrolyzing and neutralizing the sulphonated compound and vaporizing solvent and unsulphonated material therefrom. When operating in this manner, unsaponifiable material is removed at a temperature appreciably below its normal boiling point. The surprising nature of this process will be appreciated when it is considered that the distillation of such a solution to dryness, even with a current of steam, is not possible, because many of the organic sulphonates do not fuse at normal operating temperatures and many decompose at elevated temperatures. Furthermore, due to the very nature of the material, such distillation to dryness occasions extensive and uncontrollable foaming.

The process of the present invention is particularly suited to the purification of sulphonated materials formed by the reaction of sulphur dioxide and a halogen with organic compounds, and particularly with aliphatic organic compounds, such as the petroleum hydrocarbons, in the presence of light. For example, in a typical procedure, an organic compound reacts in the presence of actinic rays with sulphur dioxide and chlorine to form a mixture comprising sulphonyl chlorides and unreacted material. This mixture is heated and mixed with heated alkali solution and, in contact with an inert gas, such as steam, at a considerably higher temperature, is flashed into a chamber which is maintained at a temperature above the boiling point of water at the pressure within said chamber. Hydrolysis and neutralization take place, and an appreciable amount of water is vaporized, this water carrying along with it high-boiling unsulphonated material. The flash chamber may be operated at atmospheric, elevated or reduced pressure.

The solutions are preferably thoroughly contacted before flashing, so that rapid and complete hydrolysis and neutralization can take place simultaneously with distillation of the unreacted portion. In this manner, the chemical heat of hydrolysis and neutralization is utilized for the distillation. The energy used in flashing is regulated by control of the pressure end of the degree of vaporization of the solvent, as well as by the temperatures of the sulphonyl chloride and alkali solutions. However, as indicated supra, such energy is preferably obtained wholly or in part by injecting the mixed solutions into the flash chamber while contacting the mixture with highly superheated steam and/or other inert gases, such as kerosene vapor, flue gases, carbon dioxide, etc., at its moment of entrance into the flash chamber. When flue gases are mixed with steam for this purpose and sodium hydroxide is used for hydrolysis and neutralization, the carbon dioxide of the flue gases acts with any excess sodium hydroxide to produce sodium carbonate. Similarly, the use of stack gases containing sulphur dioxide under the same conditions produces sodium sulphite.

As aforesaid, the use of superheated gases is preferred, because, by this procedure, the solutions need not be subjected for any substantial period of time to the exceptionally high temperatures which are required for volatilizing the higher boiling unsulphonated material with the water under economical dilution, nor is it necessary that the solutions be excessively diluted to provide a sufficiently high steam-oil ratio to volatilize substantially all of the unsaponifiable matter at reduced flashing temperatures.

The superheated steam and/or other inert gas should be at a substantially higher temperature than that of the mixed solutions, and the contact with the solutions should be made at extremely high velocity and for a minimum time period before introduction into the flash chamber. The contacting of superheated gas and solutions can advantageously be accomplished by a specially designed nozzle which permits intimate but only momentary direct contact and a minimum of indirect contact before emission into the flash chamber. In this way, it is possible to supply to the solutions at the critical point sufficient heat at an optimum temperature and velocity in order to effect instantaneous hydrolysis and neutralization and to volatilize unsulphonated material and water without decomposing the product and without employing uneconomically large and impractical quantities of steam, such as are required by conventional steam distillation methods. This procedure also avoids plugging of pipes and nozzles as well as decomposition of the products, because the organic sulphonyl chloride and the alkali solutions are not mixed together a sufficient time before flashing for hydrolysis and neutralization to take place to any substantial extent and because the mixed solutions are not excessively heated before introduction into the nozzle, where they attain high velocity and adequate heat in momentary time before their discharge into the flash chamber.

The sulphonated detergents with the purification of which the present process is more particularly concerned are preferably prepared from organic compounds having not fewer than about six carbon atoms and not more than about twenty-six carbon atoms to the molecule. Materials having about twelve to about twenty carbon atoms to the molecule have been found to provide particularly suitable detergents. While petroleum hydrocarbons, such as white mineral oil, gas oils, and other petroleum fractions provide particularly good results, alcohols and olefines having at least six carbon atoms to the molecule can also be sulphonated and treated by the present process to give a desirable product. It will be understood that other organic compounds, including fatty acids, aldehydes, ketones, etc., and mixtures thereof can also be sulphonated in the manner described and treated according to the present process, or that such compounds can be separately sulphonated and the sulphonated products mixed and treated together in the manner herein described.

The organic materials selected may be sulphonated by passing a gaseous mixture of sulphur dioxide and halogen, preferably chlorine, into the material in the presence of light containing rays of short wave length, that is, those at the blue end of the spectrum. The sulphur dioxide and chlorine, instead of being premixed, may be separately introduced into the material to be sulphonated and there mixed after introduction. Either sulphur dioxide or chlorine or both may be employed in liquid form, and the reaction may be carried out in batch or continuous operation. The treatment with sulphur dioxide and chlorine is continued until sulphonyl chlorides are formed in the desired quantity.

For a better understanding of the present invention, reference may be had to Fig. 1, showing a modifiaction thereof. The unhydrolyzed reaction mixture comprising organic sulphonyl chlorides and unreacted material is contained in tank 1 and can be pumped therefrom by one of a pair of proportioning pumps 2 into a heat exchanger 3, preferably of the tubular recuperative type, where the temperature of the mixture is raised to about 60 to about 90° C. An alkaline hydrolyzing solution flows in desired amount from a tank 4 into a similar heat exchanger unit 5 under pressure from the other of the proportioning pumps 2 and is there heated to a temperature of about 60 to about 120° C. The two heated solutions pass concurrently under pressure and at high velocity through a pipe 6 having reverse bends or other conduit adapted for turbulent flow. In this manner, very rapid and thorough mixing is accomplished, and conditions favorable to hydrolysis and neutralization of the sulphonyl chlorides are set up. Due to the very short time of contact permitted, hydrolysis merely gets started in the pipe or conduit, the temperature rising only a small amount and evaporation being substantially negligible.

The design of the conduit or other equipment for rapidly and thoroughly mixing the solution containing organic sulphonyl chlorides with the alkali solution will vary depending upon the materials and the operating conditions employed, as those skilled in the art will understand. It is desirable so to design the conduit that great turbulency is set up in minimum time, so that the two solutions are very well mixed without the lapse of a sufficient time interval for the hydrolysis and neutralization to get more than a mere start.

The heated mixture coming from the pipe 6 and containing unreacted material is then introduced into a spray nozzle 7 (see Fig. 2) where it passes into a spirally voluted annular space therein. At the same time water from a tank 8 is pumped in regulated amounts through a preheater 9 to a boiler 10, where it is converted into steam. The steam is superheated to any desired temperature, preferably between about 260 and about 700° C., e. g., about 593° C., in a superheater 11 by means of a gas burner 12 or other heat source. The superheated steam is conducted to the spray nozzle 7 and is introduced into a centrally located spirally voluted tube surrounded by the annular space described as affording passage for the heated mixture. Both the central tube and the annular space have constricted openings at the outlets thereof, the tube having its outlet 13 within the constriction in the annular space and at a point short of the outlet 14 of the annular space.

The nozzle is located within a flash chamber 15, and the steam, issuing from the constricted outlet 13, impinges upon the orifice 14 of the annular space at extremely high velocity and with great force just before entering the flash chamber proper. The jet of steam is given a whirling motion by the convolutions of the spiral tube. The mixture, now thoroughly dispersed, passes through the annular passage, where it also attains an enormous velocity resulting in almost complete atomization of the mixture, thus providing maximum contact between organic sulphonyl chloride molecules and alkali molecules to promote rapid hydrolysis and neutralization and between the resulting sulphonate salt and the steam. It will be observed that, so far as contact within the nozzle is concerned, such contact of steam and heated mixture from pipe 6 is limited to the short distance between the outlet 13 of the tube and the outlet 14 of the annular space, so that the mixture must absorb heat in an extremely short time interval, thus preventing decomposition. The short path of the flow and the high velocity preclude any clogging of the tubes and orifices.

It is important that transfer of heat between steam and mixture be kept to a minimum before direct contact of the two fluids, as otherwise, due to the very high temperature of the steam, not only will hydrolysis and neutralization occur prematurely, but a film of solids will be baked out of the solution upon the outer walls of the tube, thus leading to eventual plugging, as well as causing carbonization of the sulphonate product. For this reason, the tube which acts as a conduit for the steam should have as little contact as is possible with any portion of the heated mixture from pipe 6.

Upon passing through the outlet 14, the atomized mixture suffers a considerable pressure drop in the flash chamber, which may be maintained at a temperature of about 150 to about 300° C., e. g., about 205° C., and at atmospheric or subatmospheric pressure. At this point, hydrolysis and neutralization are substantially completed, substantially all of the water and unreacted material volatilize, and the sulphonate salt drops, usually as small dry particles, to the bottom 16 of the flash chamber. From here it may be withdrawn, either at intervals or continuously, by any suitable means, such as a worm, belt conveyor, vibrating device or the like. Many compounds tend to be unstable in the presence of oxygen at elevated temperatures, and with these the dried product is preferably kept out of contact with the atmosphere after removal until cooled, say to about 130° C., or darkening of the product may occur.

Although, if desired, steam may be blown through the flash chamber or a partial vacuum may be established therein by suitable operation of an evacuating system, it is usually better, in the interest of convenience and economy, to operate at substantially atmospheric pressure. It will be appreciated that, if it is desired to operate the flash chamber under subatmospheric pressure, the removing means should have a suitable sealing device.

According to the modification of the present process illustrated at Fig. 1, the volatilized unsulphonated and unsaponifiable organic material and steam at atmospheric pressure exit from the flash chamber at the upper portion thereof and pass into a dust separator 17, where any fine particles of sulphonate product carried over by the vapors can be removed. Any suitable type of separator, such as a settler, cyclone, etc., may be used. The dust-free vapors are conducted to a thermal compressor 18, where they are compressed, and they are then led through preheaters 9, 5 and 3 to provide the heating fluid therein.

Where, as shown in Fig. 1, the heat exchangers for sulphonyl chloride and alkali solutions, respectively, are series-connected, it is advantageous to conduct the vapors first into the alkali heater and then into the heater for the sulphonyl chloride solution, as, of the two, the alkali is preferably raised to the higher temperature. It will be observed that, according to the modification depicted, the heaters are of the tubular recuperative type, the liquids flowing in coils therethrough and being heated by surrounding hot vapor issuing from the flash chamber. The heating and flow of the liquids are preferably automatically controlled. The vapors give up some of their heat to the liquids, and, being thus partly cooled, pass into a cooler or total condenser 19. The condensate passing therefrom is settled in a tank 20, where a supernatant layer of the unsaponifiable material can be removed from a separate aqueous layer. Such unsaponifiable material can be recycled in the saponification treatment, if desired.

The insertion of a thermal compressor 18, such as a steam injector or a mechanical blower or compressor, permits the greater part of the heat supplied to the system to be salvaged. By this means, the sensible heat and the latent heat of condensation of the commingled vapors give up their heat energy to the incoming sulphonyl chloride solution, to the alkaline hydrolyzing solution and to the water which is converted into steam. Radiation losses are prevented in the system by keeping the entire flash chamber at the proper temperature by means of a jacket 21 which completely encloses it. This jacket is preferably adapted to conduct hot flue gases issuing from the steam superheater 11 and/or the water boiler 10, said gases being discharged at some point adjacent to the top. Depending upon local conditions, an economizer may be added at this point to salvage more heat.

The pressure and rate of flow of the mixed solutions are controlled to a great extent by the nozzle and the pair of proportioning pumps. It is obvious that the temperature of operation in the various elements of the apparatus, such as heaters and superheaters, exercises a considerable influence upon these factors. The total quantity of steam preferably should be greater than about 30 parts by weight of steam to 1 part of unreacted organic material. Higher or lower ratios may be employed, but these ratios depend upon the quantity, volatility and boiling ranges of the unreacted material. The pressure drop in the nozzle depends upon the rate of flow of heated mixture and steam therethrough. This rate of flow in turn depends upon the pressure and rate of flow of the solutions and superheated steam supplied by the pumps, as well as by the pressure generated by the various heat transfer units. It is advantageous that the nozzle 7 be detachable from steam and solution pipes, so that nozzles of varying size can be inserted as desired. In this manner, the mixed sulphonyl chloride-alkali solutions can be contacted directly with highly superheated steam for as short a time interval as is consistent with substantially complete hydrolysis and neutralization and substantially complete equilibrium contact of the steam with the unreacted material.

According to this modification, hydrolysis and neutralization of the sulphonyl chlorides occur rapidly at a temperature to which the mixed solutions are brought by contact with the superheated steam. Hydrolysis and neutralization take place simultaneously with flash distillation of unreacted material and water at the velocity and temperature provided. Operation according to this procedure is simple in that only a few process steps and a small amount of equipment are necessary, and, furthermore, such operation utilizes the chemical heat of hydrolysis and neutralization. Great economy of operation is achieved by thus getting additional heat from the hydrolysis and neutralization after contact with the superheated steam and absorption of heat therefrom, instead of first hydrolyzing the sulphonyl chlorides and then heating the neutralized sulphonate salt solution before contact with the steam.

In practice, the proportion of superheated steam introduced into the nozzle can be so regulated that a dry product, a hydrated product or a solution can be produced. The product is in a more or less finely divided condition which permits its transformation into flakes or other physical forms, for example, by passing between a pair of properly spaced rolls, or by pressing into cakes, or by other means with or without addition agents.

It will be understood that the present method of refining organic sulphonates may be employed in conjunction with other known methods. Thus, advantage may be taken of the fact that organic sulphonyl halides are readily soluble in liquid sulphur dioxide, whereas unreacted or merely halogenated materials are insoluble or only sparingly soluble therein. The crude sulphonyl chlorides can therefore be treated with liquid sulphur dioxide in any of the foregoing modifications to form a liquid sulphur dioxide phase, and the liquid sulphur dioxide may be used with or without another solvent having a preferential solubility for unreacted or merely halogenated materials, said other solvent being used before, with, and/or after treatment with the liquid sulphur dioxide. Liquid sulphur dioxide is readily separated from the sulphonyl chlorides by vaporization and condensation, and the extraction can be carried out simultaneously with the sulphonation, if desired, thus removing organic sulphonyl chlorides from the reaction medium as they are formed. Whether or not such preliminary extraction is provided before treatment in accordance with the present process, the dried material as it comes from the flash chamber can also be subjected to an extraction for improved purification, where desired.

It is often desired to prepare the sulphonate salt free of inorganic salts, such as sodium sulphate and sodium chloride, and the like. This may be accomplished by dialysis and/or by extraction of the aqueous salt solutions with suitable solvents, such as ethyl alcohol, butyl alcohol and the like.

It will also be understood that various alkaline materials other than sodium hydroxide may be employed in hydrolyzing the sulphonyl chlorides. Thus, it may be advantageous to use sodium carbonate for this purpose, mixing the solution containing organic sulphonyl chlorides with a soda ash solution. This mixing takes place, either with or without a small proportion, say about 10%, of sodium hydroxide, just before admitting the mixed solution to the flash nozzle. Any carbon dioxide gas formed by neutralization, even in small amount in the conduit, increases the turbulence of the liquid and increases the amount of inert gases for distillation. It may be desired to form calcium, magnesium, potassium, ammonium and triethanolamine sulphonates and the like, and these may be produced in the same manner as sodium sulphonates by substituting the corresponding reagents. While it is desirable to employ aqueous solutions of the hydrolyzing agent used, other solvents, such as lower alcohols, glycerol, ethylene glycol, dioxane, etc., may be employed as solvents instead of water.

Various adjuvant agents may be added to the product, and the same may be uniformly mixed with the solution before, during, or after its preparation, and they will be uniformly disposed in the final product. In general, materials which may normally be incorporated in fatty acid soaps can likewise be included in products comprising the present invention. Thus, builders and fillers other than the sodium sulphate and sodium chloride mentioned, such as various phosphates and silicates, can also be added to the organic sulphonate salt.

A method of preparing sulphonyl chlorides adapted for treatment in accordance with this invention has been set forth, but it will be understood that other organic sulphonyl halides and halogenoids and/or organic sulphonic esters, amides, and substituted amides produced in other ways are also adaptable for such purification treatment. For example, organic sulphonyl chlorides may be produced by employing liquid sulphuryl chloride as the reacting agent in the sulphonation, advantageously along with an activating agent, such as chlorine, sulphur dioxide, carbon monoxide, sulphur, thionyl chloride, selenium, selenium oxychloride, tellurium, tellurium dioxide, and carbon bisulphide.

Another way of forming sulphonyl chlorides for treatment as aforesaid is to mix the organic materials to be sulphonated with liquid chlorine and liquid sulphur dioxide, and, if desired, with carbon tetrachloride or similar solvent, catalyzing the reaction produced with a suitable light. The liquid mass may contain sulphuryl chloride and/or a catalyst for the sulphonation reaction. In all these procedures for producing sulphonyl chlorides, the degree of sulphonation can be regulated by the proportion of reactants and by the time and temperature of treatment in the activated reaction zone.

It has been found that an improved product results from purification of the starting materials, especially where petroleum oil fractions are employed. For this purpose, the hydrocarbons or other carbon-containing compounds to be sulphonated with gaseous sulphur dioxide and chlorine or as otherwise described in the foregoing modifications can be pretreated before passing through the sulphonation apparatus. The boiling range of mixed starting materials, such as a petroleum oil fraction, can be narrowed by fractional distillation, preferably under vacuum and in the presence of caustic soda. They may also be admixed with filter clay, silica gel, or decolorizing carbon, which materials can then be separated out by filtering, settling and/or centrifuging. Solvent extraction and/or bleaching may also be employed. The pretreatment may include partial chlorination followed by separation of the unchlorinated portion either by distillation or by extraction of the chlorinated from the unchlorinated hydrocarbons with liquid sulphur dioxide. Another pretreatment method which can be employed is to treat the hydrocarbons with sulphuric acid and to separate the reaction products therefrom. Similarly, the hydrocarbons may be treated with oleum in the presence of liquid sulphur dioxide and/or other suitable solvents, followed by separation of the unreacted portion. A pretreatment which also gives satisfactory results is to contact the hydrocarbons or other carbon-containing compounds with gaseous sulphur dioxide and chlorine for a short time, followed by distillation or liquid sulphur dioxide extraction. Still another method is to hydrogenate the hydrocarbons by known procedure. Pretreatment with stannic chloride can also be used. Any of these pretreatment methods may be employed singly or in combination upon the raw materials to be sulphonated.

It is possible so to arrange the apparatus that one or more nozzles can be employed to atomize the same or different mixed solutions, thereby forming particles of uniform composition, heterogeneous mixtures and/or coated particles. In the case of coated particles, the product may be controlled as to solubility, color, odor, stability and/or the like by suitable selection of the coating.

The following illustrative example is described for the purpose of giving those skilled in the art a better understanding of the present invention. It will be apparent that this example is merely illustrative of the invention and that the same is not limited thereon.

*Example*

A Pennsylvania white mineral oil of paraffin base and having an average molecular weight of about 235 is treated at below about 50° C. with a gaseous mixture of approximately 3 parts of sulphur dioxide to 1 part of chlorine in the presence of light. This treatment is continued until the mineral oil achieves a gain in weight of about 20%; at this point, the reaction mass contains approximately 50% of sulphonyl chlorides. The product thus formed is pumped into a heater where its temperature is raised to about 80° C. The heated solution then passes into a conduit where it is turbulently mixed with an aqueous 30% solution of sodium hydroxide at about 110° C. This mixing takes only a very short time, say a few seconds, and this is insufficient for hydrolysis and neutralization to any substantial extent. The mixture is passed directly and immediately into a flash chamber.

In a separately fired furnace, steam is superheated to about 480° C. at a pressure of about 140 pounds per square inch absolute. The mixed solutions and the highly superheated steam are separately piped into a flash chamber where they are contacted in a nozzle such as that described supra and illustrated at Fig. 2. About 148 parts by weight of mixture to about 1,000 parts of superheated steam are there commingled during a momentary period of time, the steam sweeping the mixed solutions into the flash chamber at a high velocity and supplying sufficient heat at optimum temperature to hydrolyze and neutralize the sulphonyl chlorides and to vaporize substantially all the water and unreacted organic material held in suspension by the resulting sulphonate solution. The flash chamber is maintained at a temperature of about 200° C., which is below the decomposition temperature of the sulphonate salt in an inert atmosphere.

The solids drop to the bottom of the flash chamber in granular form, being a dry, odorless, substantially oil-free mixture of mineral oil sulphonate sodium salt and sodium sulphate. The product is removed from the bottom of the chamber and is cooled out of contact with air or other oxidizing medium until the temperature is below about 110° C. The vapors of water and unreacted material are removed from the top of the chamber and are condensed to recover about 93% of the unreacted oil.

The organic sulphonyl chlorides, neutralized as described during the flash distillation treatment of the present invention, may be contacted with an alkaline agent along with other saponifiable materials, such as fatty oils, fatty acids, waxes, resin acids, cycloaliphatic acids, organic sulphonic acids, and other organic and inorganic acids. Among the specific saponifiable materials which may be used are tall oil, tallow, olive oil, palm oil, coconut oil, linseed oil, China-wood oil, castor oil, wool fat, garbage grease, cottonseed oil and foots, whale oil, fish oil, babassu oil, peanut oil, spermaceti, and the various individual fatty acids in these materials, crude naphthenic acids, rosins, sulphuric acid, and various mixtures of any of these acids, waxes, oils and resins.

Among the materials which may be admixed with the organic sulphonyl halides and/or any of the other saponifiable materials set forth in the preceding paragraph, by mixing with the solutions before flashing, by simultaneously flashing a second solution thereof and/or by mixing the final product therewith are fatty acid soaps, resin acid soaps, naphthenic and alkylated naphthenic acid soaps, alkaline soap builders, water-soluble, water-softening phosphorus acid compounds, and other salts including sodium carbonate, sodium silicates, trisodium phosphate, borax, sodium tetraphosphate, sodium bicarbonate, sodium sulphate, sodium chloride, sodium acetate, sodium hypochlorite, sodium thiosulphate, sodium perborate, sodium tartrate, sodium citrate and sodium oxalate and the corresponding ammonium, substituted ammonium and potassium salts thereof; insecticidal, germicidal, styptic and medicinal agents, including aluminum chloride, mercuric chloride and various copper and lead salts; coloring agents, abrasives, fillers, and water-dispersible gums, including dyes, lakes, pigments, silica, kieselguhr, silica gel, feldspar, precipitated chalk, pumice, infusorial earth, bentonite, talc, starch, Irish moss, sugar, methyl cellulose, agar, gum tragacanth, gum arabic, and polyvinyl alcohol; liquids, such as ethyl alcohol, glycerol, cyclohexanol, naphtha, benzene, kerosene, turpentine, pine oil, decalin and tetralin and the like. The type of addition agent will depend upon the ultimate use of the new composition.

Although the present invention has been described in connection with an illustrative example thereof, it will be understood by those skilled in the art that other variations and modifications of the invention can be made and various equivalents substituted therefor without departing from the principles disclosed herein. Such variations and modifications are believed to be within the scope of the present specification and within the purview of the appended claims.

I claim:

1. The process of preparing purified organic sulphonates which comprises flashing a hot mixture containing an organic sulphonyl halide, unsulphonated material, an alkaline hydrolyzing agent and a solvent therefor into a zone maintained at a temperature above the boiling point of the solvent whereby the sulphonyl halide is hydrolyzed and neutralized and the solvent and unsulphonated material are volatilized.

2. The process of preparing purified organic sulphonates which comprises flashing a hot mixture containing an organic sulphonyl halide, unsulphonated material and an aqueous solution of an alkaline hydrolyzing and neutralizing agent into a zone maintained at a temperature above the boiling point of water whereby the sulphonyl halide is hydrolyzed and neutralized and the water and unsulphonated material are volatilized.

3. The process of preparing purified organic sulphonates which comprises flashing at hot mixture containing an organic sulphonyl chloride, unsulphonated material, an alkaline hydrolyzing agent and a solvent therefor into a zone maintained at a temperature above the boiling point of the solvent whereby the sulphonyl chloride is hydrolyzed and neutralized and the solvent and unsulphonated material are volatilized.

4. The process for preparing purified organic sulphonates which comprises flashing a hot mixture containing an organic sulphonyl chloride, unsulphonated material and an aqueous solution of an alkaline hydrolyzing and neutralizng agent into a zone maintained at a temperature above the boiling point of water whereby the sulphonyl chloride is hydrolyzed and neutralized and the water and unsulphonated material are volatilized.

5. The process of preparing purified organic sulphonates which comprises mixing a hot solution of an organic sulphonyl halide containing unsulphonated material with a hot solution of an alkaline agent during a time interval insufficient for complete hydrolysis and neutralization, then raising the temperature of the mixed solutions to effect rapid hydrolysis and neutralization of the sulphonyl halide to an organic sulphonate salt, and simultaneously reducing the pressure on the mixed solutions by an amount sufficient to cause flash distillation of the solvent for the alkaline agent whereby the solvent and unsulphonated material are volatilized.

6. The process of preparing purified organic sulphonates which comprises thoroughly mixing a hot solution of an organic sulphonyl chloride containing unsulphonated material with a hot aqueous solution of an alkaline agent during a time interval insufficient for substantial hydrolysis and neutralization, then rapidly raising the temperature of the mixed solutions to effect substantially instantaneous hydrolysis and neutralization of the sulphonyl chloride to an organic sulphonate salt, and simultaneously rapidly reducing the pressure on the mixed solutions by an amount sufficient to cause flash distillation of the water whereby the water and unsulphonated material are volatilized.

7. The process of preparing purified organic sulphonates which comprises contacting a hot mixture containing an organic sulphonyl halide, unsulphonated material, a hydrolyzing agent and a solvent therefor with an inert gas at a temperature considerably higher than the temperature of the mixture, and suddenly reducing the pressure on the mixture and the inert gas by an amount sufficient to flash distill the solvent and unsulphonated material while maintaining a temperature above the boiling point of the solvent.

8. The process of preparing purified organic sulphonates which comprises momentarily contacting a hot mixture containing an organic sulphonyl halide, unsulphonated material and an aqueous solution of an alkaline agent with a superheated inert gas to heat the mixture in momentary time to a temperature sufficient for substantially instantaneous hydrolysis and neutralization of the sulphonyl halide to an organic sulphonate salt, and substantially simultaneously reducing the pressure on the mixture and the gas by an amount sufficient to flash distill the water and unsulphonated material while maintaining the temperature above the boiling point of water.

9. The process of preparing purified and dried organic sulphonates which comprises momentarily contacting a hot mixture containing an organic sulphonyl chloride, unsulphonated material and an aqueous solution of an alkaline agent with an inert gas comprising steam at a high temperature to heat the mixture in momentary time to a temperature sufficient for substantially instantaneous hydrolysis and neutralization of the sulphonyl chloride to an organic sulphonate salt, and substantially simultaneously reducing the pressure on the mixture and the gas by an amount sufficient to flash distill substantially all the water and unsulphonated material therein while maintaining the temperature above the boiling point of water.

10. The process of preparing purified and dried organic sulphonates which comprises momentarily contacting a hot mixture containing an organic sulphonyl chloride, unsulphonated material and an aqueous solution of an alkaline agent with superheated steam under superatmospheric pressure to heat the mixture in momentary time to a temperature sufficient for substantially instantaneous hydrolysis and neutralization of the sulphonyl chloride to an organic sulphonate salt, and substantially simultaneously reducing the pressure on the mixture and the steam by an amount sufficient to flash distill substantially all the water and unsulphonated material therein while maintaining the temperature above the boiling point of water.

11. The process of preparing purified organic sulphonates which comprises mixing a hot solution of an organic sulphonyl halide containing unsulphonated material with a hot solution of an alkaline agent during a time interval insufficient for substantial hydrolysis and neutralization, contacting the hot mixed solutions with an inert gas at a temperature considerably higher than the temperature of the mixed solutions, and suddenly reducing the pressure on the solutions and the inert gas by an amount sufficient to flash distill the unsulphonated material and the solvent for the alkaline agent while maintaining a temperature above the boiling point of the solvent.

12. The process of preparing purified and dried organic sulphonates which comprises thoroughly mixing a hot solution of an organic aliphatic sulphonyl chloride containing unsulphonated material with a hot aqueous solution of an alkaline agent during a time interval insufficient for complete hydrolysis and neutralization, momentarily contacting the mixed solutions with superheated steam under superatmospheric pressure to heat the mixed solutions in momentary time to a temperature sufficient for instantaneous hydrolysis and neutralization of the sulphonyl chloride to an organic aliphatic sulphonate salt, and substantially simultaneously reducing the pressure on the solutions and the steam by an amount sufficient to flash distill substantially all of the water and unsulphonated material therein while maintaining a temperature above the boiling point of water.

13. The process of preparing purified organic sulphonates which comprises flashing a hot mixture containing a petroleum oil sulphonyl chloride, unsulphonated petroleum oil and an aqueous solution of an alkaline hydrolyzing and neutralizing agent into a zone maintained at a temperature above the boiling point of water whereby the petroleum oil sulphonyl chloride is hydrolyzed and neutralized and the water and unsulphonated petroleum oil are volatilized.

14. The process of preparing purified and dried organic sulphonates which comprises thoroughly mixing a hot solution of a petroleum oil sulphonyl chloride containing unsulphonated petroleum oil with a hot aqueous solution of sodium hydroxide during a time interval insufficient for substantial hydrolysis and neutralization, momentarily contacting the mixed solutions with superheated steam under superatmospheric pressure to heat the mixed solutions in momentary time to a temperature sufficient for substantially instantaneous hydrolysis and neutralization of the petroleum oil sulphonyl chloride to a petroleum oil sulphonate sodium salt, and substantially simultaneously reducing the pressure on the solutions and the steam by an amount sufficient to flash distill substantially all of the water and unsulphonated petroleum oil therein while maintaining a temperature above the boiling point of water.

15. A continuous process of preparing purified organic sulphonates which comprises momentarily contacting a hot mixture containing an organic sulphonyl chloride, unsulphonated material and an aqueous solution of an alkaline agent with an inert gas comprising steam at a high temperature to heat the mixture in momentary time to a temperature sufficient for substantially instantaneous hydrolysis and neutralization of the sulphonyl chloride to an organic sulphonate salt, substantially simultaneously reducing the pressure of the mixture and the gas by an amount sufficient to flash distill water and unsulphonated material therein while maintaining the temperature above the boiling point of water, removing the organic sulphonate salt, compressing the inert gas and volatilized materials, transferring heat from said compressed gas and volatilized material to preheat incoming reactants and material for preparing additional superheated inert gas whereby a substantial proportion of the volatilized materials are condensed.

16. A continuous process of preparing purified and dried organic sulphonates which comprises momentarily contacting a hot mixture containing an organic sulphonyl chloride, unsulphonated material and an aqueous solution of an alkaline agent with superheated steam under superatmospheric pressure to heat the mixture in momentary time to a temperature sufficient for substantially instantaneous hydrolysis and neutralization of the sulphonyl chloride to an organic sulphonate salt, substantially simultaneously reducing the pressure on the mixture and the steam by an amount sufficient to flash distill substantially all the water and unsulphonated material therein while maintaining the temperature above the boiling point of water, removing solid organic sulphonate salt, compressing the steam and volatilized materials, transferring heat from said compressed steam and volatilized materials to preheat incoming reactants and water for preparing additional superheated steam whereby a substantial proportion of the volatilized materials are condensed.

17. A continuous process of preparing purified and dried organic sulphonates which comprises thoroughly mixing a hot solution of an organic aliphatic sulphonyl chloride containing unsulphonated material with a hot aqueous solution of an alkaline agent during a time interval insufficient for substantial hydrolysis and neutralization, momentarily contacting the mixed solutions with superheated steam under superatmospheric pressure to heat the mixed solutions in momentary time to a temperature sufficient for momentary instantaneous hydrolysis and neutralization of the sulphonyl chloride to an organic sulphonate salt, substantially simultaneously reducing the pressure on the solutions and the steam by an amount sufficient to flash distill substantially all of the water and unsulphonated material therein while maintaining a temperature above the boiling point of water, removing solid organic aliphatic sulphonate salt, compressing the steam and volatilized materials, transferring heat from said steam and volatilized materials to preheat incoming sulphonyl chloride solution, incoming aqueous alkaline agent solution and water for preparing additional superheated steam whereby a substantial proportion of the volatilized materials are condensed.

18. A continuous process of preparing purified and dried organic sulphonates which comprises thoroughly mixing a hot solution of a petroleum oil sulphonyl chloride containing unsulphonated petroleum oil with a hot aqueous solution of sodium hydroxide during a time interval insufficient for substantial hydrolysis and neutralization, momentarily contacting the mixed solutions with superheated steam under superatmospheric pressure to heat the mixed solutions in momentary time to a temperature sufficient for substantially instantaneous hydrolysis and neutralization of the petroleum oil sulphonyl chloride to a petroleum oil sulphonate sodium salt, substantially simultaneously reducing the pressure on the solutions and the steam by an amount sufficient to flash distill substantially all of the water and unsulphonated petroleum oil therein while maintaining a temperature above the boiling point of water, removing solid petroleum oil sulphonate sodium salt, compressing steam and volatilized materials, transferring heat from said compressed steam and volatilized materials to preheat incoming petroleum oil sulphonyl chloride solution, incoming aqueous sodium hydroxide solution and water for preparing additional superheated steam whereby a substantial proportion of volatilized materials are condensed.

JOSEPH HENRY PERCY.

REFERENCES CITED

The following references are of record in the file of this patent:

UNITED STATES PATENTS

| Number | Name | Date |
|---|---|---|
| Re. 20,772 | Clayton | June 28, 1938 |
| Re. 20,968 | Reed | Jan. 3, 1939 |
| 2,096,188 | Lorenz et al. | Oct. 19, 1937 |
| 2,142,983 | Thurman | Jan. 3, 1939 |
| 2,178,532 | Thurman | Oct. 31, 1939 |
| 2,185,653 | Thurman | Jan. 2, 1940 |
| 2,187,244 | Mills | Jan. 16, 1940 |
| 2,193,824 | Lockwood et al. | Mar. 19, 1940 |

FOREIGN PATENTS

| Number | Country | Date |
|---|---|---|
| 213,711 | Great Britain | Apr. 10, 1924 |